(12) United States Patent
Yatsuri (10) Patent No.: US 9,247,220 B2
(45) Date of Patent: Jan. 26, 2016

(54) IMAGING APPARATUS INCLUDING TWO IMAGE SENSORS HAVING A DIFFERENT ARRANGEMENT

(71) Applicant: Panasonic Corporation, Osaka (JP)

(72) Inventor: Shigenori Yatsuri, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 16 days.

(21) Appl. No.: 14/249,697

(22) Filed: Apr. 10, 2014

(65) Prior Publication Data

US 2014/0347547 A1 Nov. 27, 2014

(30) Foreign Application Priority Data

May 24, 2013 (JP) ................................. 2013-109506
Nov. 8, 2013 (JP) ................................. 2013-231871

(51) Int. Cl.
| | |
|---|---|
| *H04N 9/09* | (2006.01) |
| *H04N 9/097* | (2006.01) |
| *H04N 5/369* | (2011.01) |
| *H04N 3/14* | (2006.01) |
| *H04N 5/232* | (2006.01) |

(52) U.S. Cl.
CPC ............... *H04N 9/09* (2013.01); *H04N 3/1593* (2013.01); *H04N 5/23212* (2013.01); *H04N 5/3696* (2013.01); *H04N 9/097* (2013.01)

(58) Field of Classification Search
None
See application file for complete search history.

(56) References Cited

U.S. PATENT DOCUMENTS

2011/0273599 A1* 11/2011 Murata ......................... 348/294

FOREIGN PATENT DOCUMENTS

| JP | 07-084177 A | 3/1995 |
|---|---|---|
| JP | 2008-177903 A | 7/2008 |
| JP | 2008176114 A * | 7/2008 |

* cited by examiner

*Primary Examiner* — Justin P Misleh
(74) *Attorney, Agent, or Firm* — Renner, Otto, Boisselle & Sklar, LLP (57) ABSTRACT

An imaging apparatus includes a prism for separating a first luminous flux into a plurality of second luminous fluxes, a plurality of imaging sensors disposed corresponding to the second luminous fluxes, an image generator for generating image data based on output image signals, and focus controller for executing a focusing operation based on focus detection image signals. The imaging sensors each have a plurality of imaging pixels and a plurality of phase difference pixels disposed in a specific pattern. An arrangement of a first imaging sensor, which is one of the plurality of imaging sensors, is different from an arrangement of a second imaging sensor, which is another one of the plurality of imaging sensors. The specific pattern is such that a position of a phase difference pixel of the first imaging sensor does not overlap with a position of a phase difference pixel of the second imaging sensor.

3 Claims, 7 Drawing Sheets

IMAGING APPARATUS INCLUDING TWO IMAGE SENSORS HAVING A DIFFERENT ARRANGEMENT

BACKGROUND OF THE INVENTION

1. Field of the Invention

The present disclosure relates to a multi-CCD imaging apparatus having a plurality of imaging devices.

2. Description of the Related Art

Unexamined Japanese Patent Publication No. 7-84177 (1995) discloses a 3CCD imaging apparatus for capturing a subject image through three imaging devices. The imaging apparatus is a lens interchangeable type imaging apparatus, and its object is to reduce generation of aberration at a time when an interchangeable lens is exchanged.

Unexamined Japanese Patent Publication No. 2008-177903 discloses a two-CCD imaging apparatus. This imaging apparatus has a plurality of imaging devices with an imaging pixel and a focus detecting pixel (phase difference pixel).

SUMMARY OF THE INVENTION

The present disclosure provides an imaging apparatus that includes an imaging device having a focus detecting pixel, and can be manufactured more efficiently.

An imaging apparatus of the present disclosure includes a spectroscopic part for separating a first luminous flux from a subject condensed by an optical system into a plurality of second luminous fluxes, a plurality of imaging sensors disposed corresponding to the plurality of second luminous fluxes, a generator for generating image data based on each of image signals generated by the plurality of imaging sensors, and a focus controller for executing a focusing operation of the optical system based on focus information generated by the plurality of imaging sensors. Each of the plurality of imaging sensors has a plurality of imaging pixels disposed on an imaging surface, for capturing a subject image from the second luminous fluxes to generate image signals, and a plurality of focus detecting pixels disposed on the imaging surface in a specific pattern, for generating focus information about a focus state of the optical system with respect to the subject. An arrangement of a first imaging sensor, which is one of the plurality of imaging sensors, with respect to a subject image is different from an arrangement of a second imaging sensor, which is another one of the plurality of imaging sensors, with respect to the subject image. In the specific pattern, a position of the focus detecting pixel of the first imaging sensor with respect to the subject image does not overlap with a position of the focus detecting pixel of the second imaging sensor with respect to the subject image.

According to the present disclosure, a multi-CCD imaging apparatus having imaging devices with focus detecting pixels can be manufactured more efficiently.

DETAILED DESCRIPTION OF THE PREFERRED EMBODIMENTS

An embodiment is described in detail below suitably with reference to the drawings. However, description in more detail than necessary is occasionally omitted. For example, detailed description about already-known matters and overlapped description about configurations that are substantially the same as each other are occasionally omitted. This is for avoiding the following description from being unnecessarily redundant and making understanding of the person skilled in the art easy.

The present inventor(s) provide the accompanying drawings and the following description in order for the person skilled in the art to fully understand the present disclosure, and the subject matter recited in the claims is not intended to be restricted thereby.

FIRST EMBODIMENT

A first embodiment is described below with reference to FIGS. 1 to 7.

[1. Configuration of Digital Camera]

Figure 1:
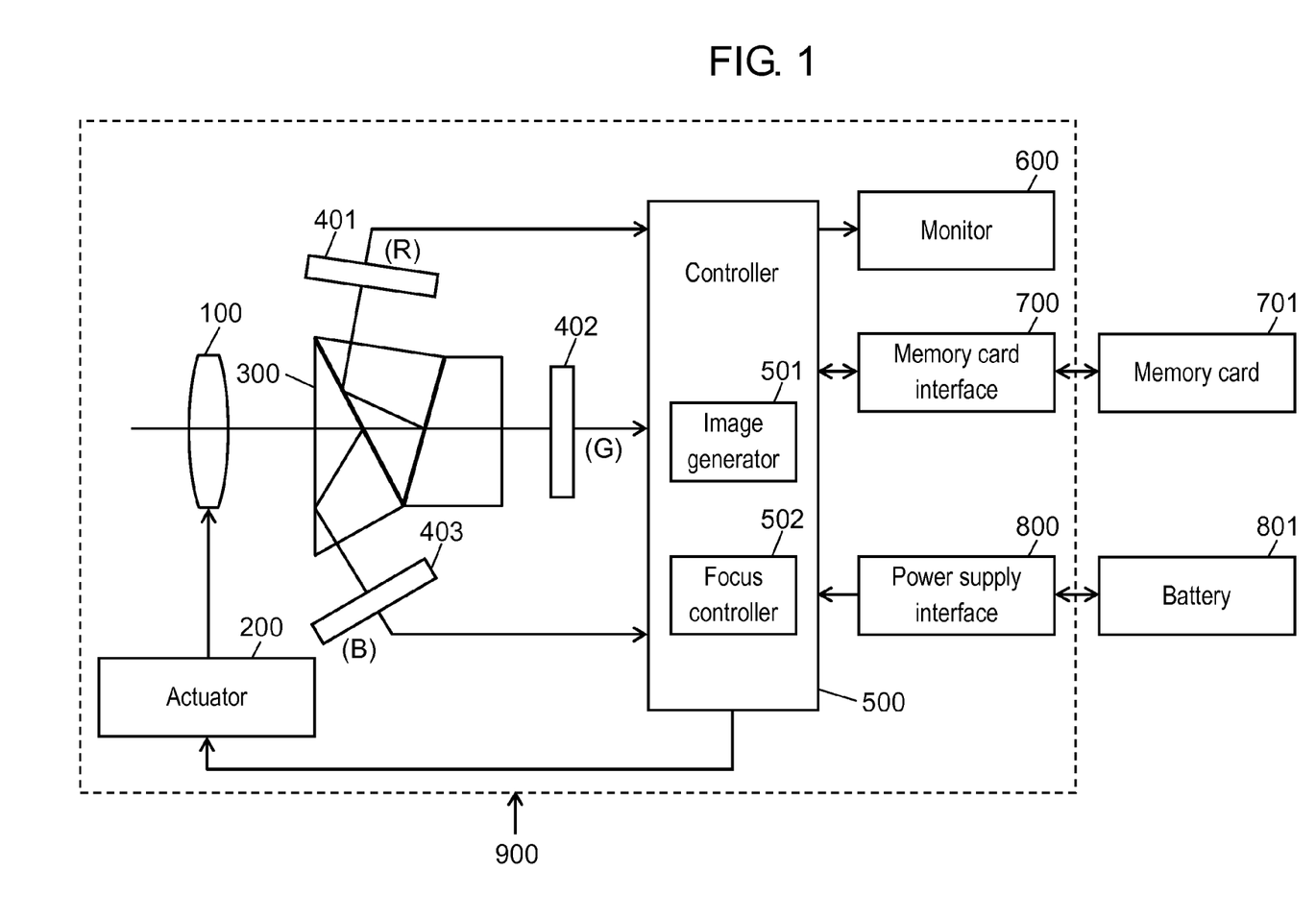
FIG. 1 is a block diagram illustrating a configuration of a digital camera according to a first embodiment.

FIG. 1 is a block diagram illustrating a configuration of digital camera 900. Digital camera 900 includes lens system 100, actuator 200, prism 300, imaging sensor R401, imaging sensor G402, imaging sensor B403, controller 500, monitor 600, memory card interface (I/F) 700, and power supply interface (I/F) 800.

Lens system 100 forms a luminous flux from a subject into an image as a subject image on imaging surfaces of the respective imaging sensors via prism 300. Lens system 100 includes a zoom lens, a focus lens, and a fixed lens, for example. The luminous flux condensed by lens system 100 is incident on prism 300. Lens system 100 is one example of an optical system. The luminous flux from the subject is one example of a first luminous flux.

Prism 300 separates the incident luminous flux into a plurality of luminous fluxes according to a wavelength of the luminous flux. Prism 300 is a dichroic prism, and separates the incident luminous flux into luminous fluxes of red light, green light, and blue light so as to emit the separated fluxes. Prism 300 is one example of a spectroscopic part. The luminous fluxes of red light, green light, and blue light are one example of second luminous fluxes.

Imaging sensor R401 is disposed on an optical axis of the red light on an emission side of prism 300. Imaging sensor G402 is disposed on an optical axis of the green light on the emission side of prism 300. Imaging sensor B403 is disposed on an optical axis of the blue light on the emission side of prism 300. The three imaging sensors are disposed on positions where optical distances from a subject are equivalent to each other at a latter stage of prism 300. Imaging sensor G402 is one example of a first imaging sensor. Imaging sensor R401 and imaging sensor B403 are one example of second imaging sensors.

The red light separated by prism 300 is incident on imaging sensor R401. Imaging sensor R401 converts the received red light into an output image signal and a focus detection image signal. The output image signal is an image signal mainly for recording and display. The focus detection image signal is an image signal including information about a focusing state of lens system 100. The focus detection image signal is an image signal mainly for focus control. The focus detection image signal is one example of focus information. Imaging sensor R401 outputs the respective converted image signals to controller 500.

The green light separated by prism 300 is incident on imaging sensor G402. Imaging sensor G402 converts the received green light into an output image signal and a focus detection image signal. Imaging sensor G402 outputs the respective converted image signals to controller 500.

The blue light separated by prism 300 is incident on imaging sensor B403. Imaging sensor B403 converts the received blue light into an output image signal and a focus detection image signal. Imaging sensor B403 outputs the respective converted image signals to controller 500.

Imaging sensor R401, imaging sensor G402, and imaging sensor B403 have the same physical configuration, but they are disposed differently with respect to prism 300. Details of the configurations of the imaging sensors and the arrangement of the imaging sensors with respect to prism 300 are described later.

Controller 500 controls digital camera 900 entirely. Controller 500 may be configured as a microcomputer that can execute programs, or configured by a logic circuit, or may have both the functions. Further, controller 500 has image generator 501 and focus controller 502. Image generator 501 and focus controller 502 can be configured by, for example, a manner that controller 500 executes corresponding programs.

Image generator 501 generates moving image data based on the output image signals acquired from imaging sensor R401, imaging sensor G402, and imaging sensor B403. Controller 500 can display the moving image data on monitor 600. Further, controller 500 can record and read moving image data in/from memory card 701 connected to memory card I/F 700.

Focus controller 502 performs a focusing operation of lens system 100 based on a focus detection image signal. Focus controller 502 calculates a command value necessary for the focusing operation using the focus detection image signals acquired from imaging sensor R401, imaging sensor G402, and imaging sensor B403. Focus controller 502 outputs the calculated command value to actuator 200.

Actuator 200 drives the focus lens of lens system 100 based on the command value acquired from focus controller 502. In such a manner, in digital camera 900, focus controller 502 can execute an auto focus (AF) process.

Power supply I/F 800 supplies power from connected battery 801 to controller 500. Controller 500 supplies the power to the respective parts. Entire digital camera 900 is operated by the power supplied from battery 801.

[2. Configuration of the Imaging Sensor]

Imaging sensor R401, imaging sensor G402, and imaging sensor B403 are the imaging sensors having the same physical configuration as described above. These imaging sensors are, therefore, collectively called imaging sensor 400. The configuration of imaging sensor 400 is described below.

[2.1 Arrangement of Pixels of the Imaging Sensor]

Figure 2:
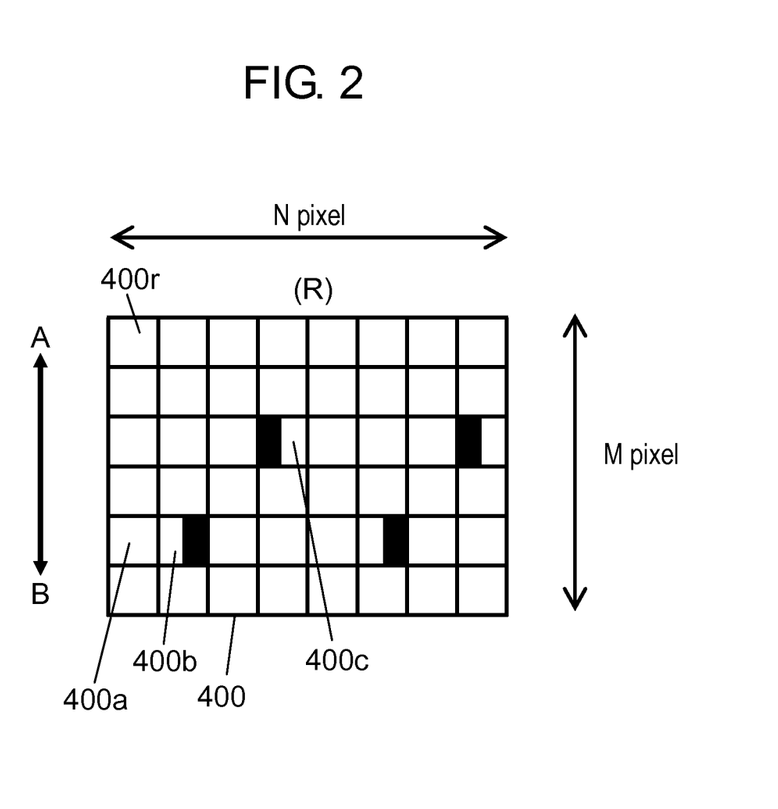
FIG. 2 is a diagram illustrating a pixel arrangement pattern of an imaging sensor according to the first embodiment.

FIG. 2 is a diagram schematically illustrating a pixel arrangement pattern of imaging sensor 400. A plurality of light reception sensors are disposed on the imaging surface of imaging sensor 400 two-dimensionally. More specifically, the light reception sensors of totally vertical M pixels×horizontal N pixels are disposed on the imaging surface of imaging sensor 400. The light reception sensors include imaging pixel 400a, phase difference pixel 400b whose right half portion is shielded, and phase difference pixel 400c whose left half portion is shielded. Imaging pixel 400a is a main pixel of the light reception sensors. Imaging pixel 400a can capture a subject image and can generate an output image signal. Phase difference pixels 400b and phase difference pixels 400c are disposed in the same number in a specific pattern with them dispersing in an array of imaging pixels 400a. A set of one phase difference pixel 400b and one phase difference pixel 400c are disposed on the imaging surface so as to be close to each other. Phase difference pixels 400b and phase difference pixels 400c can each capture a subject image, and output a focus detection image signal. For later description, a position of one pixel at the upper left end of imaging sensor 400 in the drawings is set as reference position 400r. Further, in a short side direction of imaging sensor 400, a direction approaching reference position 400r is determined as a direction A, and a direction away from reference position 400r is determined as a direction B. This is for further clarifying the direction of the arrangement of imaging sensor 400.

[2.2 Relative Arrangement of the Imaging Sensors]

Figure 3:
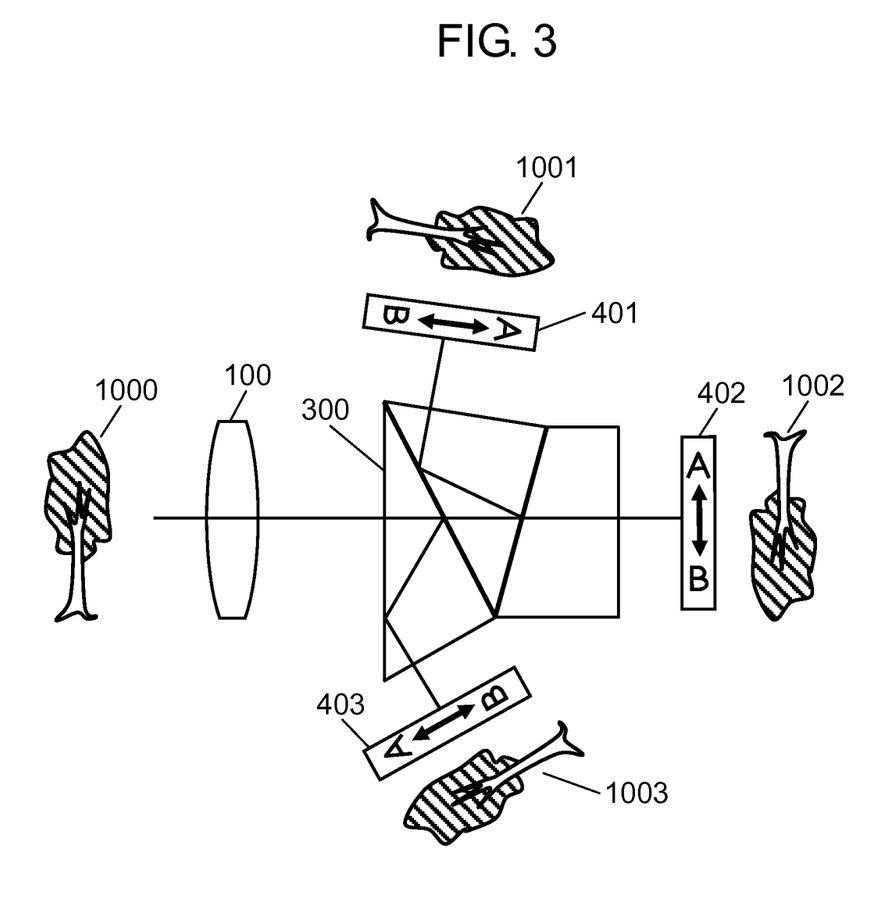
FIG. 3 is a diagram illustrating a direction of the arrangement of the imaging sensor according to the first embodiment.
Figure 4:
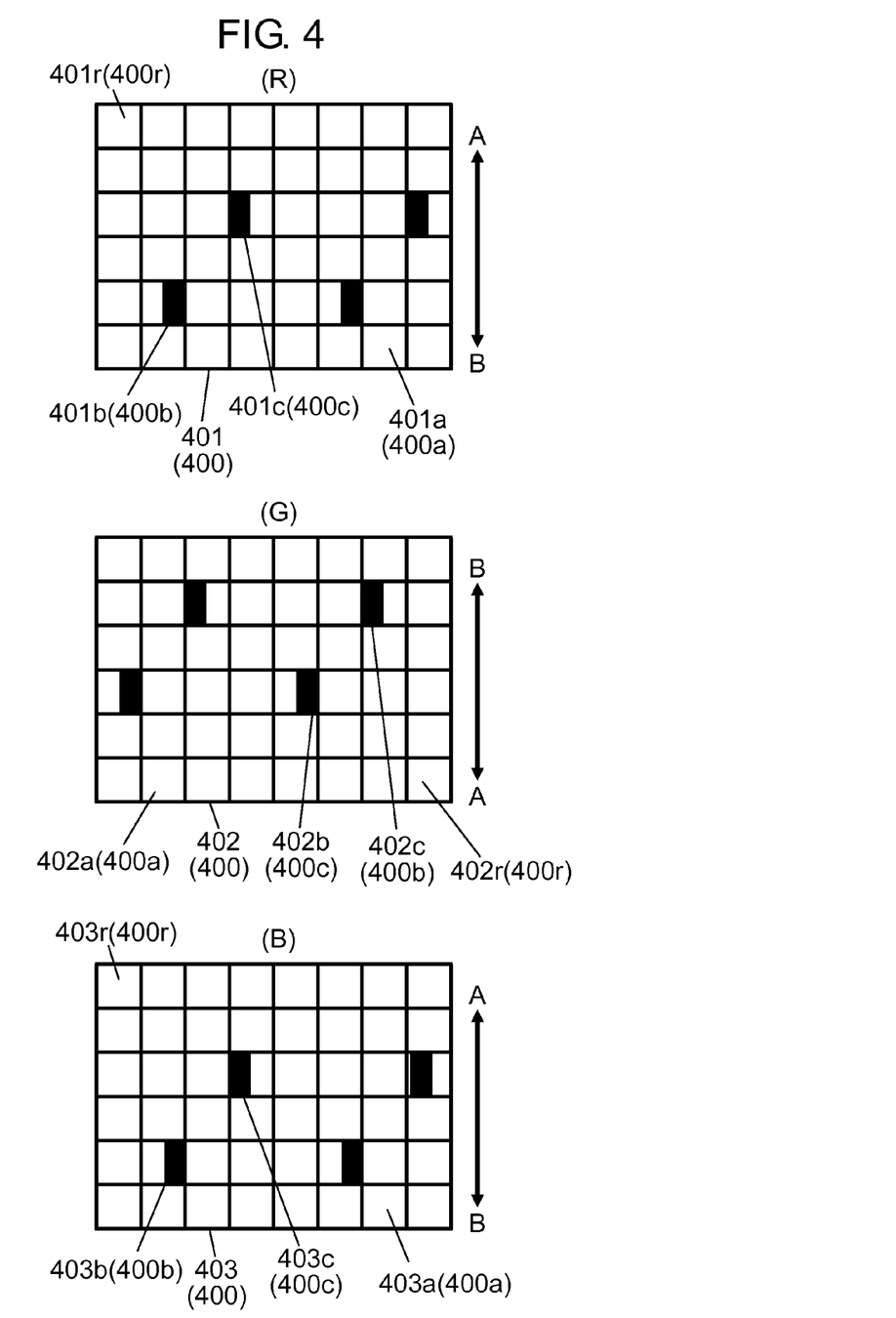
FIG. 4 is a diagram illustrating the direction of the arrangement of the imaging sensor according to the first embodiment.

FIG. 3 and FIG. 4 are diagrams illustrating the directions of the arrangements of the respective imaging sensors in digital camera 900. FIG. 3 is a diagram schematically illustrating a state of the relative arrangements of the respective imaging sensors with respect to a subject image. When digital camera 900 captures subject 1000, subject images captured by imaging sensor R401, imaging sensor G402 and imaging sensor B403 are determined as subject image 1001, subject image 1002 and subject image 1003, respectively.

A luminous flux from subject 1000 is separated into three luminous fluxes by prism 300. Subject image 1001, subject image 1002, subject image 1003 from the respective separated luminous fluxes are formed on the corresponding imaging sensors so that their up-down directions are as shown in the drawings. Imaging sensor R401 is disposed so that the up direction of the subject image matches with the direction A. Similarly imaging sensor B403 is disposed so that the up direction of the subject image matches with the direction A.

On the other hand, imaging sensor G402 is disposed so that the up direction of subject image 1002 matches with the direction B. That is to say, the relative arrangement of imaging sensor G402 with respect to subject image 1002 is different from the relative arrangement of imaging sensor R401 (or imaging sensor B403) with respect to subject image 1001 (or subject image 1003). More specifically, the relative arrangement of imaging sensor G402 with respect to subject image 1002 rotates by 180° about an optical axis with respect to the relative arrangement of imaging sensor R401 (or imaging sensor B403) with respect to subject image 1001 (or subject image 1003).

FIG. 4 is a diagram illustrating the relative arrangements of the respective imaging sensors with respect to the subject images for further clarifying the relationship of the pixel arrangement. In the drawing, the respective imaging sensors are disposed so that their up directions match with the up direction of the subject images. Imaging pixel 400a corresponds to imaging pixel 401a, imaging pixel 402a and imaging pixel 403a in the respective imaging sensors. The reference position 400r corresponds to a reference position 401r, a reference position 402r and a reference position 403r of the respective imaging sensors.

Further, phase difference pixel 400*b* corresponds to phase difference pixel 401*b*, phase difference pixel 402*c* and phase difference pixel 403*b*. Phase difference pixel 400*c* corresponds to phase difference pixel 401*c*, phase difference pixel 402*b* and phase difference pixel 403*c* of the respective imaging sensors. The correspondences are described below.

Phase difference pixel 400*b* (the right half portion is shielded) in a case of description of imaging sensor 400 is shielded on a left half portion viewed from a subject side in imaging sensor G402 disposed with 180° rotation. Therefore, phase difference pixel 400*b* corresponds to phase difference pixel 402*c* (the left half portion is shielded) in imaging sensor G402. Similarly, phase difference pixel 400*c* corresponds to phase difference pixel 402*b* (the right half portion is shielded) in imaging sensor G402.

Further, in digital camera 900 according to this embodiment, imaging sensor R401 (or imaging sensor B403) and imaging sensor G402 are disposed in an arrangement pattern where the phase difference pixels do not overlapped with each other. This arrangement pattern is described below.

As described above, imaging sensor G402 is disposed so as to rotate by 180° with respect to the other two imaging sensors. For this reason, in imaging sensor G402, the arrangements of the reference position, the imaging pixel and the phase difference pixel rotate by 180° with respect to the other imaging sensors. The arrangement position of the phase difference pixel of imaging sensor G402 does not overlap with the arrangement position of the phase difference pixel of imaging sensor R401 (or imaging sensor B403). That is to say, the phase difference pixel of imaging sensor 400 is disposed in an arrangement pattern such that the position of the phase difference pixel with respect to the subject image does not overlap with the position of the phase difference pixel of imaging sensor 400 rotating by 180°.

For this reason, a position of a defective pixel is different between imaging sensor R401 (or imaging sensor B403) and imaging sensor G402. Therefore, when image generator 501 generates moving image data, image generator 501 can generate a moving image with a higher image quality.

More specific description is given. The phase difference pixel can be realized by, for example, shielding the half of one pixel. Therefore, controller 500 recognizes a phase difference pixel as a defective pixel, and generates an image signal on that position through interpolation using an image signal from another imaging pixel. The phase difference pixels of imaging sensor R401, imaging sensor G402 and imaging sensor B403 are disposed on the same position, the positions of defective pixels to be interpolated are the same as each other. Therefore, a specific place in the output image signal is interpolated. In this case, the interpolation of defective pixels concentrates on one position, and deterioration of image quality is noticeable. On the contrary, in this embodiment, the position of the phase difference pixel is different between imaging sensor R401 (or imaging sensor B403) and imaging sensor G402. For this reason, the interpolation of defective pixels on the same position can be prevented. Therefore, the deterioration of the image quality can be prevented.

Further, since the phase difference pixels are disposed on all imaging sensor R401, imaging sensor G402 and imaging sensor B403, the focusing operation with higher accuracy can be realized. Contents of the focusing operation are described later.

[3. Moving Image Recording Process]

Figure 5:
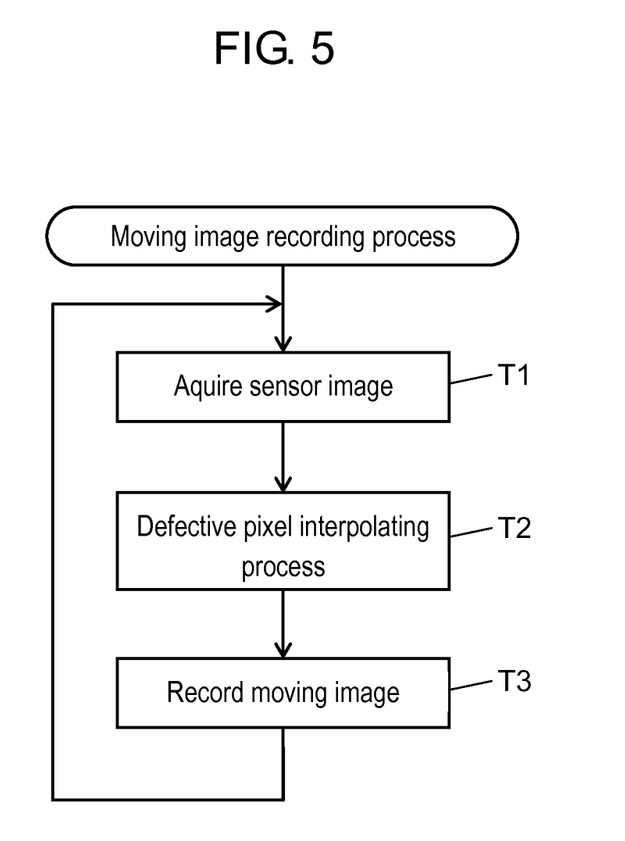
FIG. 5 is a flowchart for describing a moving image recording process according to the first embodiment.

FIG. 5 is a flowchart of a moving image recording process. When a photographer presses a release button (not shown) of digital camera 900, image generator 501 starts a process for recording a moving image. Image generator 501 reads the output image signals from imaging sensor R401, imaging sensor G402 and imaging sensor B403 (T1). In the first embodiment, imaging sensor G402 is disposed so as to rotate by 180° with respect to imaging sensor R401 and imaging sensor B403. Therefore, image generator 501 controls reading from imaging sensor G402 differently from imaging sensor R401 and imaging sensor B403. That is to say, image generator 501 instructs imaging sensor R401 and imaging sensor B403 to start reading a pixel on 1 line 1 row from reference position 401*r* and reference position 403*r*, namely, in raster order. On the other hand, image generator 501 instructs imaging sensor G402 to start reading a pixel on M line N row corresponding to a position diagonal to reference position 402*r* in reverse raster order. Such reading makes the directions of the output image signals read from the respective imaging sensors uniform. More specifically, the directions of a subject included in images represented by the output image signals are made to be uniform. For this reason, a process for rotating images so that the directions of the images are uniform does not have to be executed later, and thus the process efficiency is improved.

Image generator 501 executes a process for interpolating defective pixels of the output image signals acquired from the respective imaging sensors (T2). The place in the imaging sensor where phase difference pixel is disposed corresponds to a defective pixel. In step T2, image generator 501 generates an output image signal on the position corresponding to the defective pixel in imaging sensor R401 through interpolation. Similarly, image generator 501 generates a defective pixel on imaging sensor G402 through interpolation. Further, image generator 501 generates a defective pixel in imaging sensor B403 through interpolation. An example of the process for interpolating a defective pixel is calculation of an average value of values of 8 pixels adjacent to a position corresponding to the defective pixel in an output image signal. Image generator 501 records the output image signal where the defective pixel is interpolated as moving image data in memory card 701 to be connected to memory card I/F 700 (T3).

[4. AF Process]

Figure 6:
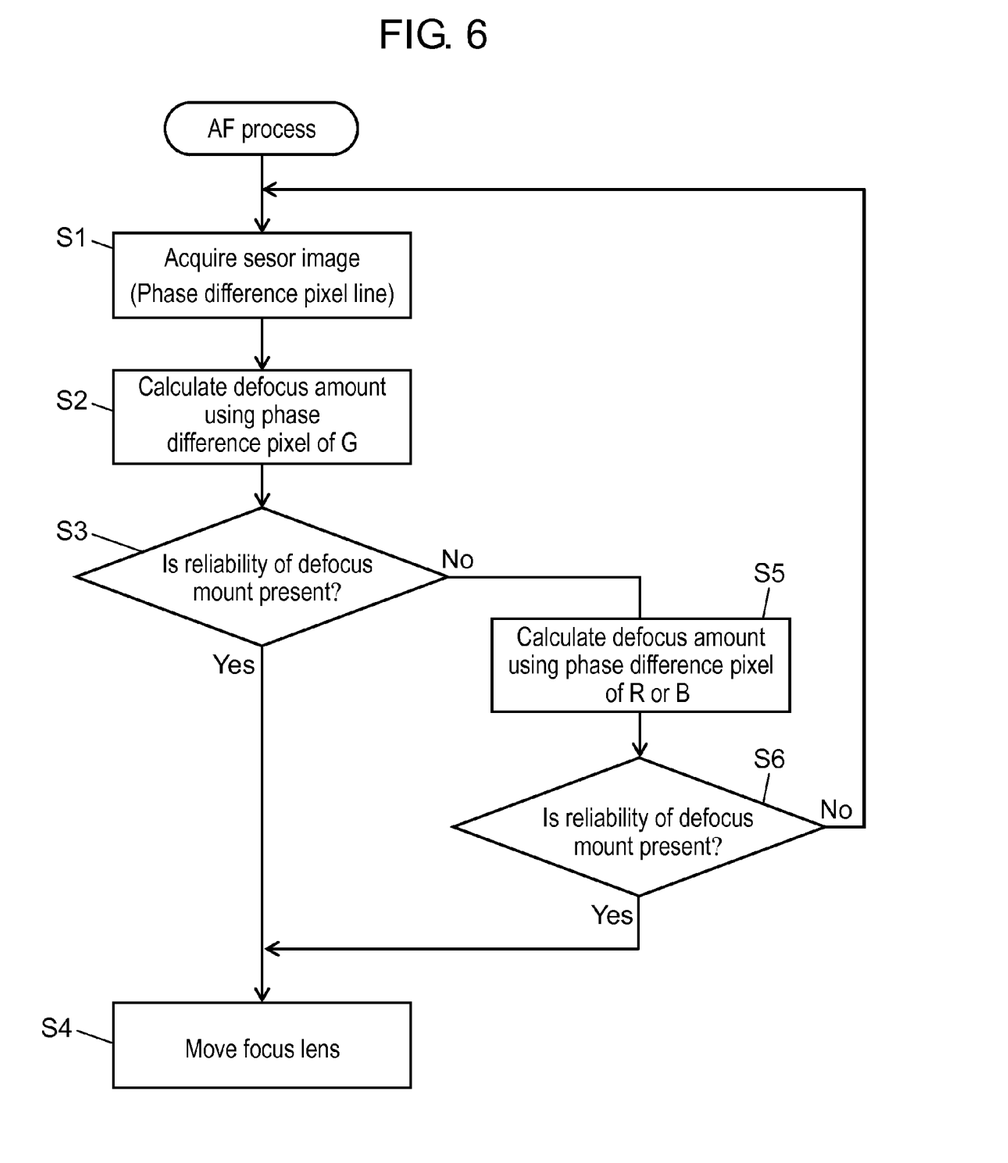
FIG. 6 is a flowchart for describing an AF process according to the first embodiment.

FIG. 6 is a flowchart of the focusing operation (AF process) in focus controller 502.

Focus controller 502 executes the AF process at a predetermined timing while a moving image is being photographed. For example, focus controller 502 executes the AF process at every constant time.

In the AF process, focus controller 502 reads the output image signals and focus detection image signals on lines having a phase difference pixel from imaging sensor R401, imaging sensor G402 and imaging sensor B403 so as to acquire line signals (S1).

Focus controller 502 calculates a defocus amount using the focus detection image signal corresponding to the green light read from imaging sensor G402 (S2). The calculation of the defocus amount is described. The focus detection image signals acquired from all phase difference pixels 402*b* included in imaging sensor G402 are right shielding image signals. Further, the focus detection image signals acquired from all phase difference pixels 402*c* included in imaging sensor G402 are left shielding image signals. Focus controller 502 detects a shift amount between images of the right shielding image signal and the left shielding image signal. The shift amount is the defocus amount.

Figure 7:
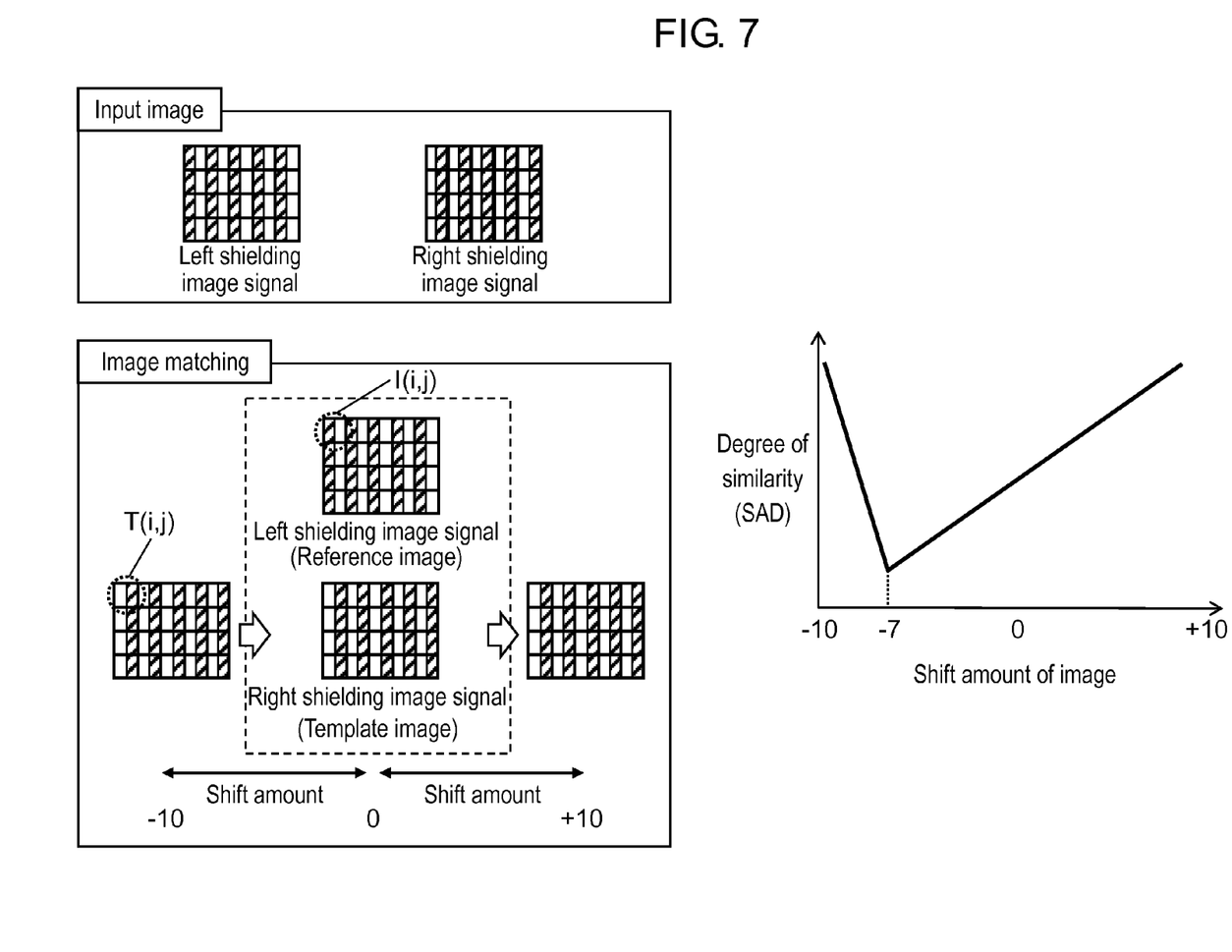
FIG. 7 is a diagram for describing an image matching process according to the first embodiment.

The shift amount can be calculated by an image matching process for the right shielding image signal and the left shielding image signal. FIG. 7 is a diagram for describing the image matching process. In the image matching process, one of the two image signals is a reference image, and the other one is a template image. While the position of the template image is being moved with respect to the reference image, a degree of similarity of a corresponding region is calculated, and a position where the degree of similarity is the highest is obtained. In this embodiment, while the left shielding image signal as the reference image and the right shielding image signal as the template image are being moved, the degree of similarity is calculated. As the degree of similarity, SAD (Sum of Absolute Difference) can be used. SAD is a value obtained by summing absolute values of the differences between pixel values on the corresponding positions, and is defined by the following equation:

$$SAD = \Sigma_{i=0}^{X-1} \Sigma_{j=0}^{Y-1} |I(i,j) - T(i,j)|$$ [Equation 1]

where a pixel value of the reference image is I (x, y), a pixel value of the template image is T (x, y), and a size of a target region where the degree of similarity is calculated is horizontal X pixel×vertical Y pixel.

Focus controller 502 calculates the degree of similarity, for example, for a case where a right shielding image signal is shifted to the left direction by 10 pixels with respect to a left shielding image signal (a shift amount of the pixels is "−10"). Focus controller 502 then shifts the right shielding image signal to a right direction by one pixel, so as to calculate the degree of similarity. Focus controller 502 repeats the calculation of the degree of similarity until a place where the right shielding image signal shifts to the right direction by 10 pixels with respect to the left shielding image signal (the shift amount of the pixel is "+10").

Focus controller 502 obtains the shift amount of the pixel using the obtained degree of similarity. Concretely, focus controller 502 obtains the shift amount of the image at a time when the degree of similarity is minimum. The shift amount of the image obtained in such a manner is the defocus amount. For example, when the obtained degree of similarity has a result in FIG. 7, focus controller 502 determines that the shift amount is 7 pixels in the left direction, namely, "−7" pixels. Therefore, the defocus amount is "−7".

Focus controller 502 determines reliability of the defocus amount obtained in step S2 (S3). Focus controller 502 determines the reliability using the degree of similarity obtained at the time when the shift amount of the pixels is calculated. Concretely, focus controller 502 obtains an average value of the degree of similarity obtained by shifting the right shielding image signal by "−10" to "+10" with respect to the left shielding image signal. Focus controller 502 determines whether a difference between an average value and a minimum value of the degree of similarity is a predetermined value or more. When the difference is the predetermined value or more, focus controller 502 determines that the reliability is present, but when not the predetermined value or more, no reliability is present.

When determining that the reliability is present in step S3, focus controller 502 executes a process for moving the focus lens of lens system 100 based on the defocus amount obtained in step S2 (S4). Concretely, focus controller 502 calculates the position of the focus lens where focus is achieved based on the current position of the focus lens and the defocus amount. Focus controller 502 controls actuator 200 so as to move the focus lens to the position of the focus lens.

On the other hand, when determining in step S3 that no reliability is present, focus controller 502 calculates the defocus amount using the focus detection image signals of imaging sensor R401 and imaging sensor B403. As the calculating method, the method similar to that in step S2 is used. That is to say, focus controller 502 calculates the defocus amount using the phase difference pixel 401b and the phase difference pixel 401c of imaging sensor R401. Further, focus controller 502 calculates the defocus amount using the phase difference pixel 403b and the phase difference pixel 403c of imaging sensor B403.

Focus controller 502 determines the reliability of the defocus amount of imaging sensor R401 and imaging sensor B403 obtained in step S5 (S6). The reliability determining method is similar to step S3. When the reliability is present in at least one defocus amount, focus controller 502 goes to step S4. On the other hand, when determining that no reliability is present in both the defocus amounts, focus controller 502 goes to step S1.

When determining in step S6 that the reliability is present, focus controller 502 selects the defocus amount with higher reliability from the defocus amounts obtained from imaging sensor R401 and imaging sensor B403 so as to execute the AF process in step S4. Concretely, focus controller 502 selects the defocus amount where the difference between the average value and the minimum value of the degree of similarity is larger.

[5. Effect etc.]

As described above, in this embodiment, digital camera 900 includes prism 300 for separating a luminous flux from a subject condensed by lens system 100 into a plurality of luminous fluxes, imaging sensor R401, imaging sensor G402 and imaging sensor B403 disposed corresponding to the separated plurality of luminous fluxes, respectively, image generator 501 for generating image data based on the output image signals generated by the plurality of imaging sensors, and focus controller 502 for executing the focusing operation of lens system 100 based on the focus detection image signals generated by the plurality of imaging sensors. Each of the plurality of imaging sensors has a plurality of imaging pixels disposed on an imaging surface, for capturing a subject image from a luminous flux to generate an output image signal and a plurality of phase difference pixels disposed on the imaging surface in a specific pattern, for generating the focus detection image signal including information about the focus state of lens system 100 with respect to the subject. The arrangement of imaging sensor G402, which is one of the plurality of imaging sensors, with respect to a subject image is different from the arrangement of imaging sensor R401 (or imaging sensor B403), which is another one of the plurality of imaging sensors, with respect to the subject image. Further, as to the specific pattern, the position of the phase difference pixel of imaging sensor G402 with respect to the subject image does not overlap with the position of the phase difference pixel of imaging sensor R401 (or imaging sensor B403) with respect to the subject image.

As a result, while overlapping of the position of the phase difference pixel among the plurality of imaging sensors is reduced, imaging sensor R401 (or imaging sensor B403) and imaging sensor G402 can be composed of the same parts. For this reason, a multi-CCD digital camera having imaging sensors with phase difference pixels can be manufactured more efficiently.

Further, in digital camera 900, the relative position of imaging sensor G402 with respect to the subject image rotates by a predetermined angle with respect to the relative arrangement of imaging sensor R401 (or imaging sensor B403) with respect to the subject image.

As a result, a multi-CCD digital camera having an imaging sensor with phase difference pixels can be manufactured more efficiently.

Further, in digital camera 900, image generator 501 reads the output image signal generated by imaging sensor G402 in order different from order in which the output image signal generated by imaging sensor R401 (or imaging sensor B403) is read.

Further, in digital camera 900, image generator 501 reads the output image signals generated by imaging sensor G402 in order different from order where the output image signal generated by imaging sensor R401 (or imaging sensor B403) is read so that a direction of an image represented by the output image signal read from imaging sensor G402 is the same as a direction of an image represented by the output image signal read by imaging sensor R401 (or imaging sensor B403).

As a result, the directions of the subjects included in the images represented by the output image signals read from the respective imaging sensors are uniform. For this reason, a process for rotating images so that the directions of the images are uniform does not have to be executed later, and thus the process efficiency is improved.

OTHER EMBODIMENT

The first embodiment is described above as the example of the technique disclosed in this application. However, the technique of the present disclosure is not limited to this, and can be applied also to embodiments where modification, replacement, addition and omission are suitably made. Further, the components described in the first embodiment are combined so that new embodiment can be formed.

In the first embodiment, imaging sensor G402 is disposed so as to rotate with respect to imaging sensor R401 and imaging sensor B403. As the arrangements of the imaging sensors, the relative position of a certain imaging sensor with respect to a subject image may be different from arrangements of the other imaging sensors so that the positions of phase difference pixels do not overlap with each other. Therefore, imaging sensor R401 may be disposed so as to rotate with respect to imaging sensor G402 and imaging sensor B403. Further, imaging sensor B403 may be disposed so as to rotate with respect to imaging sensor R401 and imaging sensor G402.

In the first embodiment, imaging sensor G402 is disposed so as to rotate by 180° with respect to imaging sensor R401 and imaging sensor B403. As the arrangements of the imaging sensors, the relative position of a certain imaging sensor with respect to a subject image may be different from arrangements of the other imaging sensors so that the positions of phase difference pixels do not overlap with each other. Therefore, a certain imaging sensor may be disposed so as to rotate by 90° with respect to the other imaging sensors.

In the first embodiment, imaging sensor G402 is disposed so as to rotate with respect to imaging sensor R401 and imaging sensor B403. As the arrangements of the imaging sensors, the relative position of a certain imaging sensor with respect to a subject image may be different from arrangements of the other imaging sensors so that the positions of phase difference pixels do not overlap with each other. Therefore, the relative arrangement of imaging sensor G402 with respect to the subject image is moved in parallel with respect to the relative arrangement of imaging sensor R401 (or imaging sensor B403) with respect to the subject image by a predetermined amount. The positions of phase difference pixels may shift from each other.

In the first embodiment, the imaging sensors has the configuration of 3CCDs including imaging sensor R401, imaging sensor G402 and imaging sensor B403. As the configuration of the imaging sensors, the plurality of imaging sensors may be provided. Therefore, the configuration of two CCDs, such as an imaging sensor G for capturing green light and an imaging sensor R/B for capturing red light and blue light may be employed. In this case, the imaging sensor R/B may be disposed so as to rotate with respect to the imaging sensor G.

In the first embodiment, imaging sensor R401, imaging sensor G402, and imaging sensor B403 have the same physical configuration. At least two of the plurality of imaging sensors may have the same physical configuration, and the relative arrangements of the imaging sensors with respect to a subject image may be different from each other. Therefore, any two imaging sensors in the 3CCD configuration may have the same physical configuration and their arrangements may be different from each other. The residual one may have a physical configuration different from the two imaging sensors.

In the first embodiment, lens system 100 of digital camera 900 is fixed to digital camera 900. The lens system may be detachable from digital camera 900. That is to say, digital camera 900 may be configured by an interchangeable lens having the lens system, and a camera body having imaging sensors.

The first embodiment describes the operation for generating moving image data to be performed by digital camera 900 as an example. The present disclosure can be applied to imaging apparatuses that can photograph an image. An image may be a moving image or a still image.

In the first embodiment, image generator 501 makes the reading control over imaging sensor G402 different from the reading control over imaging sensor R401 the imaging sensor B403. Image generator 501 may make the reading control over imaging sensor G402 being the same as the reading control over imaging sensor R401 and imaging sensor B403. In this case, image generator 501 may execute the rotating process on the output image signal so that an image represented by the output image signal read from imaging sensor G402 rotates by 180°.

In the configuration of digital camera 900 according to the first embodiment, a color filter corresponding to each luminous flux may be provided between prism 300 and the respective imaging sensors. For example, a color filter for transmitting the red light may be provided on the imaging surface of imaging sensor R401. The same holds true for the other imaging sensors. As a result, wavelength characteristic of each luminous flux obtained by spectral characteristics of prism 300 can be further adjusted by the color filter.

The embodiment is described above as the example of the technique of the present disclosure. For this reason, the accompanying drawings and the detailed description are provided.

Therefore, the components described in the accompanying drawings and the detailed description include not only components essential for solving a problem but also components that are not essential for solving a problem in order to illustrate the above technique. For this reason, even if these unessential components are described in the accompanying drawings and the detailed description, these unessential components should not be immediately approved as being essential.

Further, since the above embodiment illustrates the technique of the present disclosure, various modifications, replacements, additions and omissions can be made within the scope of claims and the equivalent thereof.

The present disclosure can be applied to a multi-CCD imaging apparatus having an imaging device with a focus detecting pixel. Concretely, the present disclosure can be applied to digital still cameras and cam coders.

What is claimed is:

1. An imaging apparatus comprising:
a spectroscopic part for separating a first luminous flux from a subject condensed by an optical system into a plurality of second luminous fluxes;
a plurality of imaging sensors disposed corresponding to the plurality of second luminous fluxes;
a generator for generating image data based on each of image signals generated by the plurality of imaging sensors; and
a focus controller for executing a focusing operation of the optical system based on focus information generated by the plurality of imaging sensors,
wherein each of the plurality of imaging sensors has
a plurality of imaging pixels disposed on an imaging surface for capturing a subject image from the second luminous fluxes to generate image signals, and
a plurality of focus detecting pixels disposed on the imaging surface in a specific pattern, for generating focus information about a focus state of the optical system with respect to the subject,
the plurality of imaging sensors have the same specific pattern, the plurality of imaging sensors include a first imaging sensor and a second imaging sensor that is rotated by a predetermined angle with respect to the first imaging sensor, wherein by rotating the second imaging sensor by the predetermined angle, an arrangement of the first imaging sensor with respect to the subject image is different from an arrangement of the second imaging sensor with respect to the subject image, such that the specific pattern of the focus detecting pixel of the first imaging sensor with respect to the subject image is positioned so as not to correspond with the specific pattern of the focus detecting pixel of the second imaging sensor with respect to the subject image.

2. The imaging apparatus according to claim 1, wherein the generator reads the image signal generated by the first imaging sensor in order different from order where the image signal generated by the second imaging sensor is read.

3. The imaging apparatus according to claim 2, wherein the generator reads the image signal generated by the first imaging sensor in order different from order where the image signal generated by the second imaging sensor is read so that a direction of an image represented by the image signal read from the first imaging sensor is the same as a direction of an image represented by the image signal read from the second imaging sensor.

* * * * *